United States Patent [19]
Kambayashi et al.

[11] Patent Number: 5,953,205
[45] Date of Patent: Sep. 14, 1999

[54] PORTABLE TYPE INFORMATION APPARATUS HAVING A FIRST HOUSING WITH A DISPLAY PORTION AND A SECOND HOUSING MOVABLE TO COVER THE FIRST HOUSING WITH A KEY IN ONE, EXTENDING INTO A RECESS OF THE OTHER, OF THE FIRST AND SECOND HOUSINGS

[75] Inventors: Ko Kambayashi; Hideyuki Motoyama, both of Kawasaki, Japan

[73] Assignee: Fujitsu Limited, Kawasaki, Japan

[21] Appl. No.: 08/866,142

[22] Filed: May 30, 1997

[30] Foreign Application Priority Data

Oct. 11, 1996 [JP] Japan .................................. 8-270091

[51] Int. Cl.⁶ .................................. G06F 1/16; H05K 5/02
[52] U.S. Cl. .......................................... 361/680; 361/681
[58] Field of Search ..................................... 361/680, 681, 361/682, 683; 364/708.1; G06F 1/16

[56] References Cited

U.S. PATENT DOCUMENTS

| | | | |
|---|---|---|---|
| 5,428,355 | 6/1995 | Jondrow et al. ........................ | 361/680 |
| 5,455,737 | 10/1995 | Ogami et al. .......................... | 361/680 |
| 5,465,191 | 11/1995 | Nomura et al. ........................ | 361/681 |
| 5,481,645 | 1/1996 | Bertino et al. ......................... | 361/680 |
| 5,483,253 | 1/1996 | Suganuma et al. .................... | 361/680 |
| 5,494,447 | 2/1996 | Zaidan .................................... | 439/31 |
| 5,534,891 | 7/1996 | Takano .................................. | 361/680 |
| 5,660,488 | 8/1997 | Miller .................................... | 400/486 |

*Primary Examiner*—Lynn D. Field
*Attorney, Agent, or Firm*—Staas & Halsey

[57] ABSTRACT

To provide a portable type information apparatus having a suspend/resume key capable of minimizing a risk of unintentional erroneous key operations, for example, when the apparatus is transported, which is excellent in visibility and operability. The apparatus includes a lower housing 5 having a keyboard 3 and an upper housing 9 coupled to the lower housing 5 to be folded onto the upper surface of the lower housing 5, wherein a suspend/resume key 21 is provided substantially at a central position of the innermost zone of the upper surface of the lower housing relative to the keyboard, so that an unintentional operation of the suspend/resume key 21 is minimized. A state-displaying section 31 for displaying various operation states is located in the upper housing 9 to confront the suspend/resume key 21 when the upper housing 9 is folded, which state-displaying section 31 is provided at a level lower by an amount corresponding to the projecting amount of the suspend/resume key 21 than the upper surface of the upper housing.

16 Claims, 4 Drawing Sheets

PORTABLE TYPE INFORMATION APPARATUS HAVING A FIRST HOUSING WITH A DISPLAY PORTION AND A SECOND HOUSING MOVABLE TO COVER THE FIRST HOUSING WITH A KEY IN ONE, EXTENDING INTO A RECESS OF THE OTHER, OF THE FIRST AND SECOND HOUSINGS

BACKGROUND OF THE INVENTION

1. Field of the Invention

The present invention relates to a portable type information apparatus, such as a notebook type personal computer or a word processor, and more particularly to a portable type information apparatus comprising an upper housing and a lower housing with a keyboard, arranged so that both the upper and lower housing fold onto each other.

2. Description of the Related Art

Recently, a miniaturization of a portable type information apparatus, such as a notebook type personal computer, has been significantly accelerated due to the rapid progress of electronic technology, whereby the user can always carry the information apparatuses even outside the office.

Since it is useless in the information apparatus of such a type that all electronic parts are always supplied with an electric power, the electric power is preferably not supplied, for example, to a CPU and input/output parts but solely to a memory or other elements essential to maintain the operation of the information apparatus. Particularly, when the personal computer is driven by a battery, it is necessary to reduce the power consumption as much as possible.

For this purpose, a suspend/resume key is provided and operated by the operator to control the operation mode to a suspend mode to reduce the power consumption. The suspend mode is obtained by once pushing the suspend/resume key, and the apparatus is released therefrom and returned to the original mode by the second push.

Such a suspend/resume key has been provided on the lateral side of the lower housing of the personal computer since early times.

There is a risk, when the suspend/resume key is located at the above-mentioned position, of an unintentional key operation when the personal computer is carried in a bag or otherwise, which causes useless battery power consumption.

Accordingly, an object of the present invention is to provide a portable type apparatus having a mode switching key which is free from the unintentional key operation during transportation but is easily visible and excellent in its operability.

SUMMARY OF THE INVENTION

According to the present invention, a portable type information apparatus comprises: a lower housing having a keyboard on the upper surface thereof; an upper housing coupled to the lower housing so as to be folded onto the upper surface of the lower housing; and a mode switching key provided substantially at a central position of the innermost zone of the upper surface of the lower housing relative to the keyboard, so that an unintentional or erroneous operation of the mode switching key is minimized.

Preferably, the mode switching key is a suspend/resume key for obtaining a low power consumption mode.

Preferably, the mode switching key projects by a predetermined amount from the upper surface of the lower housing.

Preferably, a state-displaying section for displaying various operation states is located in the upper housing so as to confront the mode switching key when the upper housing is folded.

Preferably, the state-displaying section is provided at a level lower, by an amount corresponding to the projecting amount of the mode switching key, than the upper surface of the upper housing.

Therefore, according to the present invention, erroneous key operations can be minimized because the mode switching key is provided at a position where the key is easily visible and the keyboard operation is not disturbed and, further, an unintentional key operation is completely eliminated because the key is completely covered with the upper housing when the apparatus is transported.

If the mode switching key is the suspend/resume key, it is possible to safely and assuredly maintain any of the optional power consumption states.

If the mode switching key projects by a predetermined amount from the upper surface of the lower housing, the operability of the key is enhanced.

If the state-displaying section is provided at a level which is lower, by an amount corresponding to the projecting amount of the mode switching key than the upper surface of the upper housing, the interference therebetween is avoidable thereby to prevent the unintentional operation of the mode switching key.

According to another aspect of the present invention, a portable type information apparatus comprises a first housing; a second housing coupled to the first housing to be folded onto the upper surface of the first housing; and a mode switching key provided substantially at a central position of the innermost zone of the upper surface of the first housing, so that unintentional operations of the mode switching key are minimized.

Preferably, the mode switching key is a suspend/resume key for obtaining a low power consumption mode. Preferably, the mode switching key projects by a predetermined amount from the upper surface of the first housing. Preferably, a state-display section for displaying various operation states is located in the second housing so as to confront the mode switching key when the second housing is folded onto the first housing. Preferably, the state-displaying section is provided at a level lower, by an amount corresponding to the projecting amount of the mode switching key, than the surface of the second housing.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

The present invention will be described in more detail below with reference to the preferred embodiments illustrated in the attached drawings.

Figure 1:
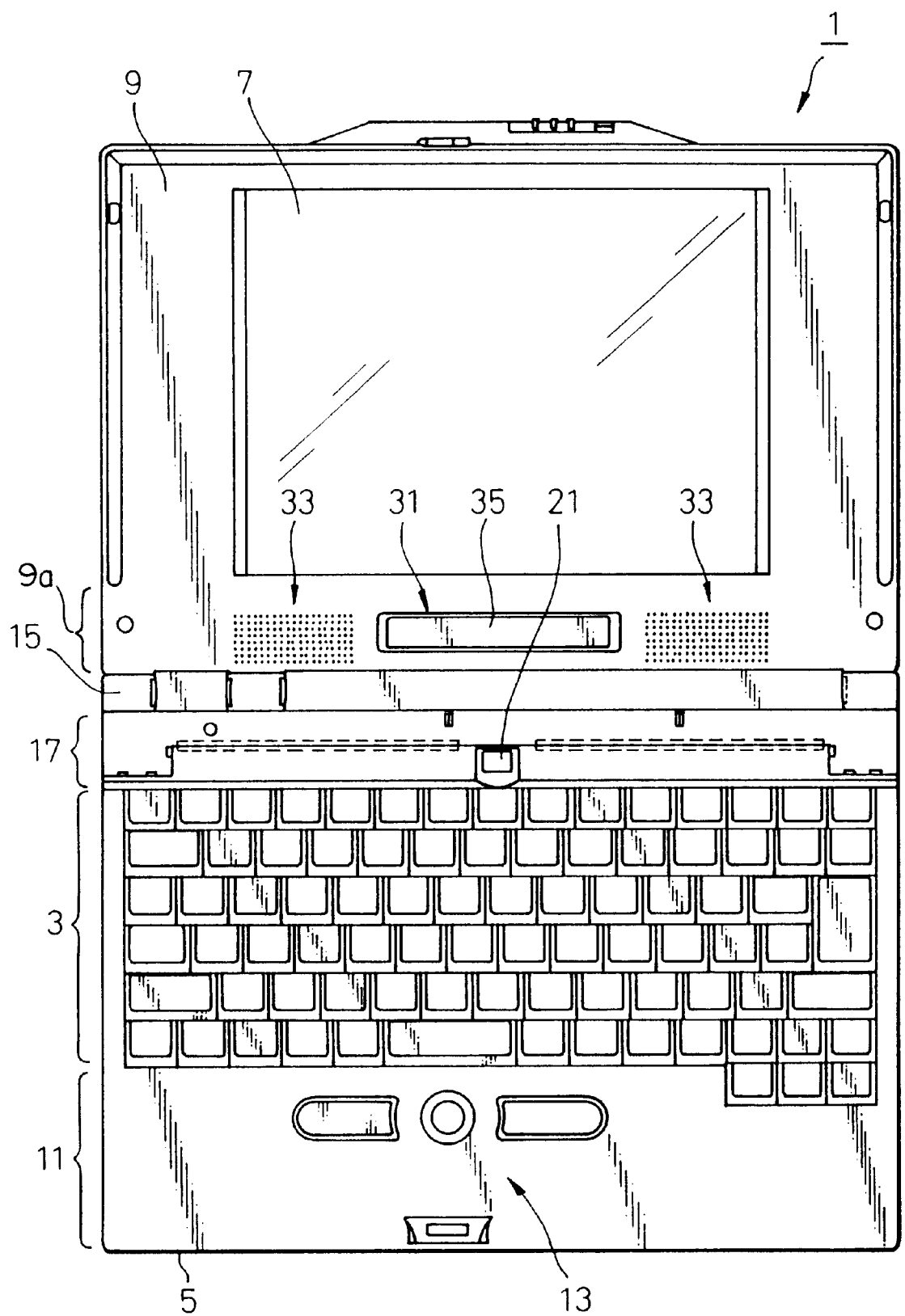
FIG. 1 is a plan view of a notebook type personal computer according to one embodiment of the present invention, in an open state.

FIG. 1 is a schematic plan view of a notebook type personal computer 1 according to one embodiment of the present invention. With reference to this drawing, the personal computer 1 consists of a lower housing 5 in which is built in a main circuit board carrying a CPU or other devices and having a keyboard 3 on the upper surface thereof, and an upper housing 9 coupled in a hinged-door manner to an edge portion (innermost side) of the lower housing 5 and having a liquid crystal display 7 in a central area thereof. The upper housing 9 is folded onto the lower housing 5 to form an integral case, convenient for transportation.

On the operator's side relative to the keyboard 3, provided while crossing the central area of the upper surface of the lower housing 5, there is a palm rest section 11 wherein a pointing device 13 of a ball type is provided at a center thereof.

A hinge (i.e., coupling) section 15 is provided along the innermost edge of the lower housing 5, farthest from the operator's side beyond the keyboard 3, for coupling of the latter to the upper housing 9, while leaving an upper surface vacant space 17 of about 20 mm wide between the hinge section 15 and the keyboards.

In a central region of the upper surface vacant area 17, a suspend/resume key 21 is provided. The suspend/resume key 21 has a function for interrupting the supply of electric power to electronic parts, including the CPU and those relating to the output/input, except for memories, so that the power consumption in the personal computer is restricted to a low level.

Figure 2:
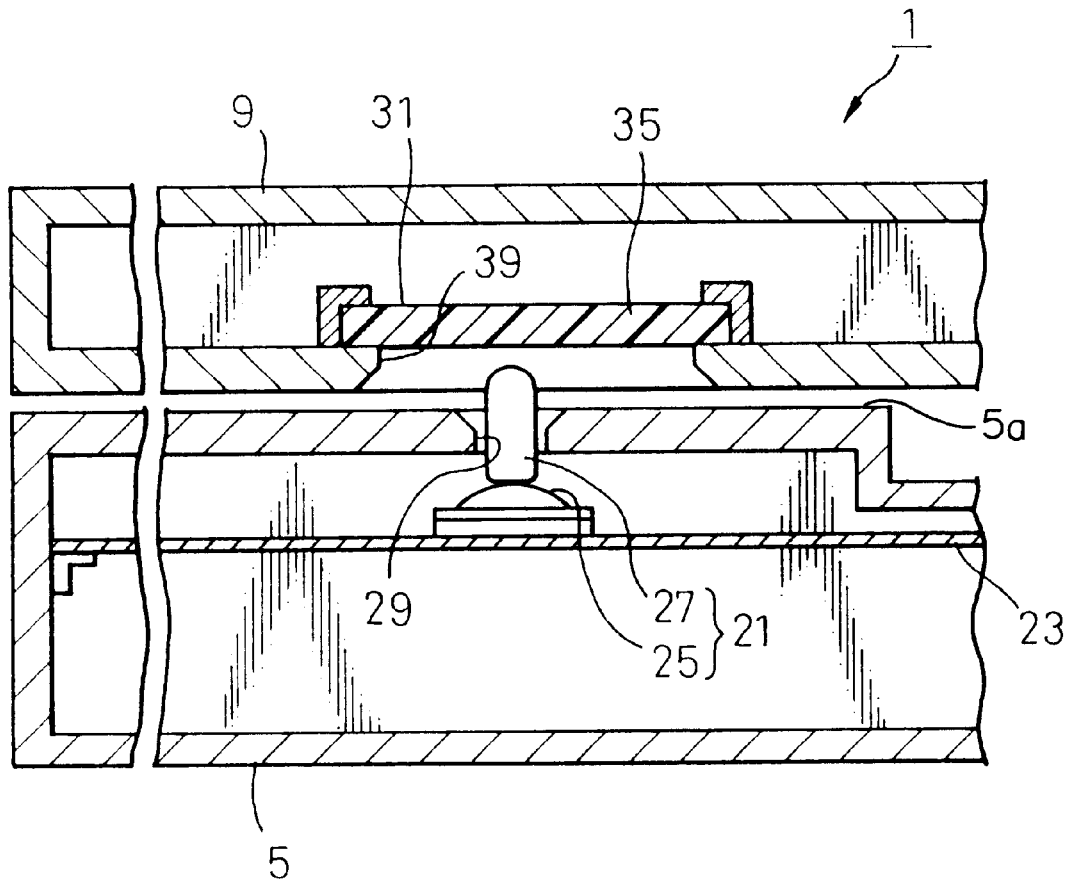
FIG. 2 is a side elevation, cross-sectional view illustrating a positional relationship between a suspend/resume key and a state-displaying section when a lower housing is closed.

As shown in FIG. 2, the suspend/resume key 21 includes a contact 25 provided on a substrate 23 within the lower housing 5 and an actuator 27 of a square pillar type for driving the former. The actuator 27 slightly projects upwardly from the upper surface 5a of the lower housing 5 through a corresponding chamfered opening 29.

Figure 3:
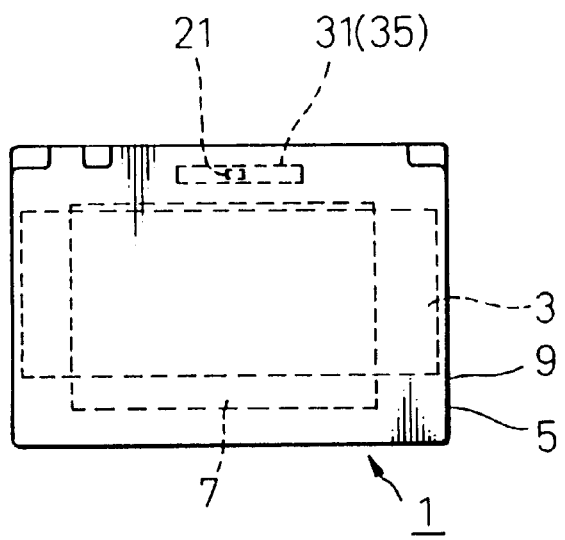
FIG. 3 is a plan view illustrating a positional relationship between the suspend/resume key and the state-displaying section when the upper and lower housings are closed.

Next, the description will be made of the upper housing 9. In a lower (i.e., innermost) area 9a of the main surface of the upper housing 9, beneath the large size liquid crystal display 7 of a rectangular shape, a so-called state-displaying section 31 is provided in a central region which confronts the suspend/resume key 21 of the lower housing 5 when the upper housing 9 is closed (folded) to (i.e., onto) the lower housing 5 (see FIG. 3). Sound output sections 33 having a number of small apertures are provided on both sides of the state-displaying section 31.

The state-displaying section 31 has a function of visually displaying whether or not predetermined electronic devices internal or external to the personal computer are operative or inoperative, and basically consists of an elongated liquid crystal substrate 35.

The liquid crystal substrate 35 forming the state-displaying section 31 is attached to the inner wall of the interior of the upper housing 9 so that a main part thereof is visible through an elongated rectangular through-hole 39 (FIG. 2). Accordingly, an exposed surface of the liquid crystal substrate 35 is positioned inwardly by a wall thickness of the upper housing 9 (about 1 mm to 1.5 mm) of the display surface of the upper housing 9. In this regard, there is a small clearance (gap) between the lower housing 5 and the upper housing 9, even if the upper housing 9 is completely closed.

Figure 4:
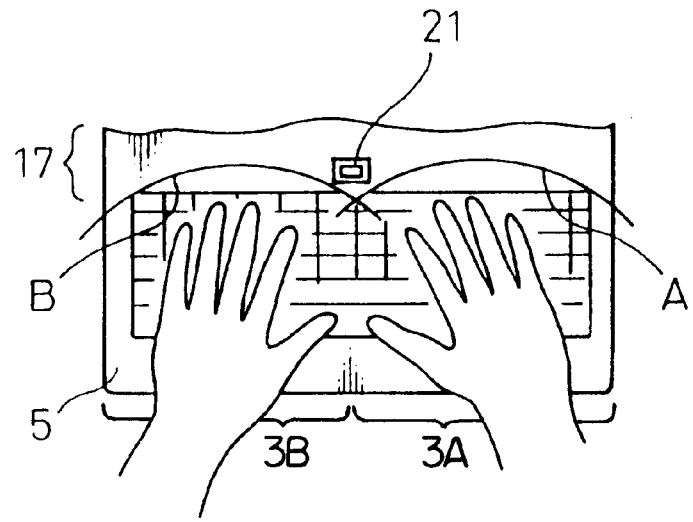
FIG. 4 is a plan view for illustrating a touch type area when the keyboard is operated.

According to the above embodiment, the following effects are achievable due to a characteristic arrangement of the suspend/resume key 21:

As shown in FIG. 4, so-called touch-type areas 3A and 3B are identified within circles A and B, respectively, each having a center at that of the respective palm placed on the keyboard 3 when the keyboard 3 is operated by the operator's hands, and the upper surface vacant area 17 is located outside both the circles A, B, which is not touched, but is not difficult to be touched, by the operator's hands.

Figure 5:
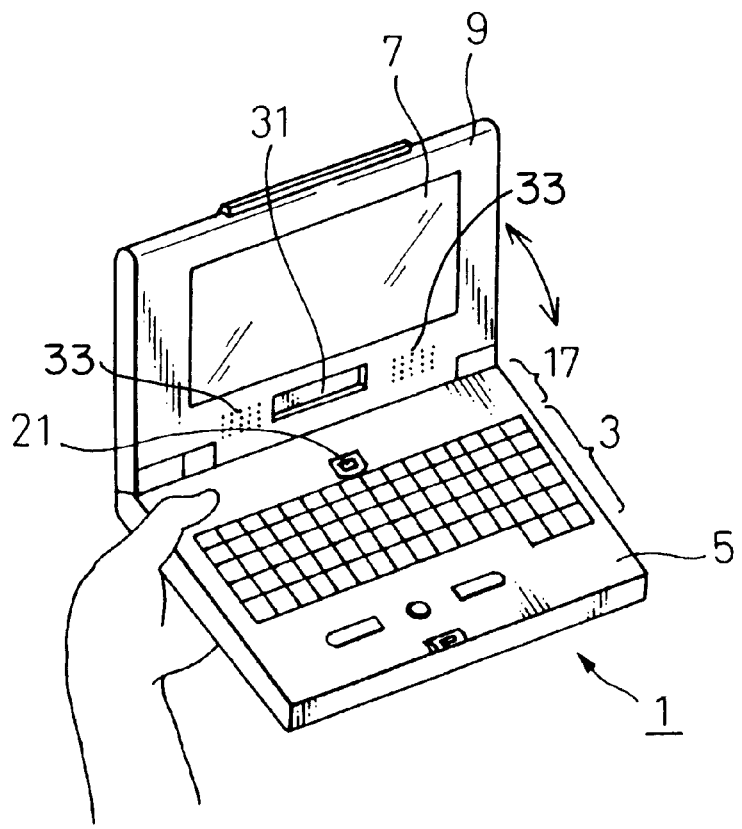
FIG. 5 is a perspective view for illustrating the transportation of a personal computer.

When the personal computer 1 is carried by the left hand of the operator while the upper housing 9 is in an open state, the leftside region of the upper surface vacant space 17 is grasped as shown in FIG. 5. In this regard, if the right hand is used, the rightside region of the personal computer is grasped.

Accordingly, the central region of the upper surface vacant space 17, wherein the suspend/resume key 21 is present, is hardly touched by the user's hands during the usual keyboard operation or the transportation of the personal computer.

Thus, according to this embodiment wherein the suspend/resume key 21 is provided at such a position, it is possible to effectively reduce a risk of unintentional or erroneous operation of the suspend/resume key. Particularly, such a risk is completely avoidable when the personal computer is transported in the folded state.

Also, since the state-displaying section 31 is provided in the upper housing 9 at a position corresponding to the position, in the lower housing 5, of the suspend/resume key 21 so that a vacant space is obtained above the suspend/resume key 21, in the closed condition of the housings 5 and 9 (see FIG. 2) the following effects are obtainable.

In the conventional design, when the suspend/resume key 21 projects upwardly, extending above the display surface of the upper housing 9, it would be necessary to provide a recess in the upper housing 9 for receiving the projected portion of the suspend/resume key 21. However, the provision of such a recess in the upper housing solely for this purpose is not only apparently uneconomical but also unfavorable from the view point of aesthetics and mechanical strength.

Contrarily, according to the present invention, the state-displaying section 31 provided in a recessed position when confronting the suspend/resume key 21 when the upper housing 9 is closed onto the lower housing 5. In addition, the projected amount of the suspend/resume key 21 itself is restricted by taking such a situation into account. That is, the projected amount is defined to be smaller than a wall thickness of the upper housing 9.

Therefore, this design is very economical and reasonable because there is hardly any risk of unintentional or erroneous operation of the suspend/resume key 21.

In the above embodiment, the present invention is applied to the personal computer. However, the present invention should not be limited thereto but effectively applicable to other portable type electronic apparatuses such as a word processor or the like.

Similarly, the above design according to the present invention is applicable not only to the suspend/resume key but also to other mode switching keys.

As stated above, according to the present invention, a portable type information apparatus is provided, having a mode switching key capable of minimizing a risk of unintentional key operation, for example, when it is transported, but which is excellent in visibility and operability. Specifically, since the mode switching key is provided at a position which is easily visible and does not disturb the keyboard operation, erroneous key operations are reduced. Also, since the mode switching key is covered by the upper housing when the apparatus is transported, an unintentional key operation is completely avoided. If the mode switching key is a suspend/resume key, it is possible to safely and assuredly maintain the apparatus at any of desired selectable power consumption states. Also, if the mode switching key projects upwardly from the upper surface of the lower housing, the operability thereof is facilitated. If the state-displaying section is recessed from the surface of the upper housing by an amount corresponding to the projected amount of the mode switching key, the unintentional operation is avoidable because the state-displaying section does not interfere with the mode switching key.

Figure 6:
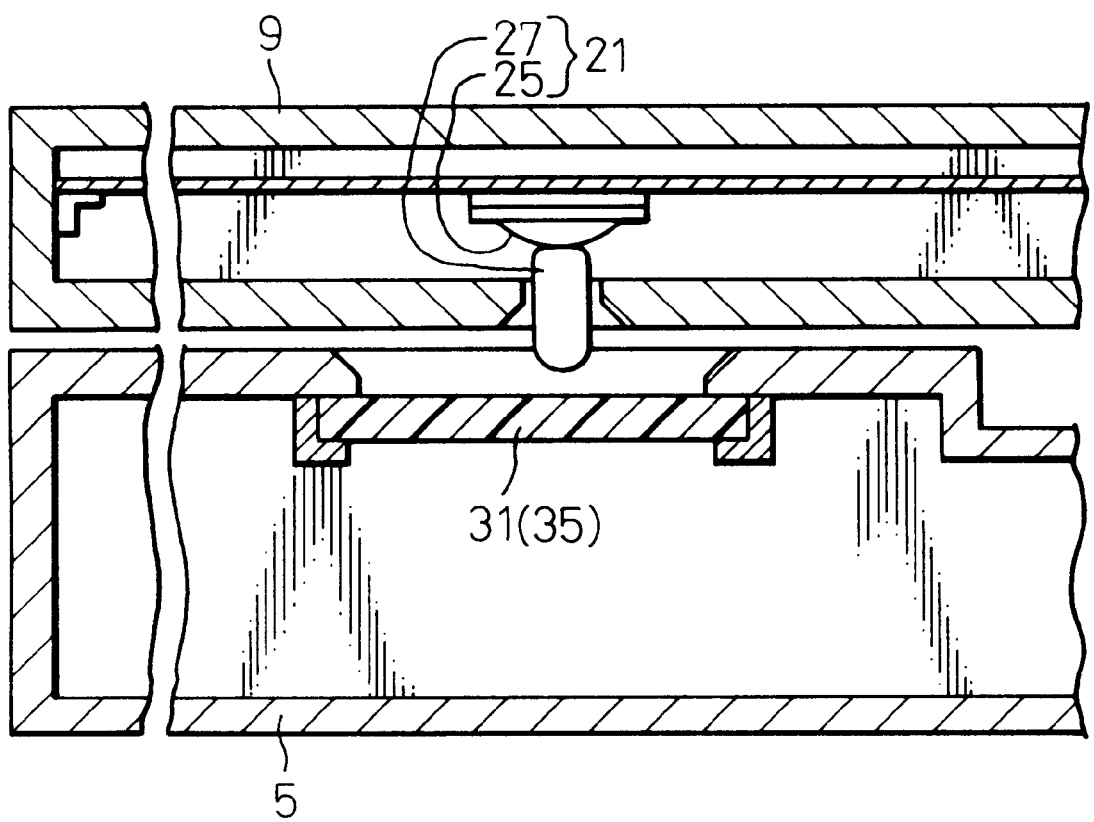
FIG. 6 is a side elevation cross-sectional view illustrating another positional relationship between a suspend/resume key and a state-displaying section.

Additionally, as seen in the embodiment of FIG. 6, the state-displaying section 31 may be provided in the central region of the upper surface vacant area, between the hinge section and the keyboard, of the lower housing 5, and the suspend/resume key 21 may be provided in the central region of the upper housing 9 which confronts the state-displaying section 31 of the lower housing 5 when the upper housing 9 is closed to onto the lower housing 5.

It is to be understood that the invention is by no means limited to the specific embodiments illustrated and described herein, and that various modifications thereof may be made which come within the scope of the present invention as defined in the appended claims.

We claim:

1. A portable information apparatus, comprising:
    a lower housing having a keyboard on a main surface thereof;
    an upper housing comprising a main surface having a first portion for a display screen and a second portion with a recess therein, the upper housing being coupled to the lower housing along a coupling line and being foldable about the coupling line to a closed position in which the respective main surfaces of the upper and lower housings are in opposed relationship; and
    a mode switching key disposed at a substantially central position of an innermost zone, between the coupling line and the keyboard, of the main surface of the lower housing and projecting into the recess in the second portion of the main surface of the upper housing in the closed position of the upper and lower housings, precluding actuation of the mode switching key.

2. The portable type information apparatus of claim 1, wherein the mode switching key is a suspend/resume key for selectively changing between an operational power level mode and a low power level consumption mode.

3. The portable information apparatus of claim 1, wherein the mode switching key projects from the main surface of the lower housing by a first distance, transverse to the main surface of the lower housing, which is less than a second distance defined by the depth of the recess relative to the main surface of the upper housing.

4. The portable type information apparatus of claim 1, further comprising a state-displaying section for displaying various operation states of the information apparatus, located in the recess of the main surface of the upper housing and in confronting but spaced relationship relatively to the mode switching key when the upper and lower housings are in the closed position.

5. The portable information apparatus of claim 4, wherein the state-displaying section is disposed within the recess by greater than the first distance from the main surface of the upper housing so as to be confronted, but not contacted, by the mode switching key in the closed position of the upper and lower housings.

6. The portable information apparatus of claim 2, wherein the mode switching key projects from the main surface of the lower housing by a first distance, transverse to the main surface of the lower housing, which is less than a second distance defined by the depth of the recess relative to the main surface of the lower housing in the closed position of the upper and lower housings.

7. The portable information apparatus of claim 2, further comprising a state-displaying section for displaying various operation states of the information apparatus, located in the recess of the main surface of the upper housing and in confronting but spaced relationship relatively to the mode switching key when the upper and lower housings are in the closed position.

8. An apparatus, comparing:
    first and second housings having respective main surfaces;
    the second housing being coupled to the first housing along a coupling connection, the first and second housings being foldable about the coupling connection to a closed position thereof in which the respective main surfaces thereof are in opposed relationship;
    the respective main surface of one of the first and second housings having a first, larger portion and a second, smaller portion, the second portion including a recess;
    a state-display section disposed in the recess; and
    a mode switching key disposed in the respective main surface of the other of the first and second housing and projecting from the respective main surface thereof so as to confront and be spaced from the state-display section when the first and second housings are folded to the closed position.

9. The apparatus of claim 8, wherein the mode switching key is a suspend/resume key selectively changing between an operational power level mode and a low power level consumption mode.

10. The apparatus of claim 8, wherein:
    the main surface of the first housing has a keyboard zone, for receiving and mounting thereon a keyboard, and an innermost zone between the keyboard zone and the coupling connection; and
    the mode switching key and the state-display section are disposed in the respectively associated housings such that the mode switching key projects from the respective main surface of the associated housing into the recess in the respective main surface of the other, associated housing in alignment with the innermost zone of the main surface of the first housing.

11. The apparatus of claim 10, wherein:
    the recess and the state-display section are disposed in the main surface of the second housing in alignment with the inner most zone of the main surface of the first housing when the first and second housings are in the closed position; and
    the mode switching key is disposed in the innermost zone of the main surface of the first housing and projects therefrom, in the closed position of the first and second housings, into the recess in the second portion of the main surface of the second housing and in confronting, but non-contacting, relationship with respect to the state-display section.

12. The apparatus of claim 10, wherein:

the recess and the state-display section are disposed in the innermost zone of the main surface of the first housing; and the mode switching key is disposed in the second main surface of the second housing in alignment with the innermost zone of the main surface of the first housing when the first and second housings are in the closed position and projects therefrom, in the closed position of the first and second housings, into the recess in the second portion of the main surface of the first housing and in confronting, but non-contacting, relationship with respect to the state-display section.

13. The apparatus of claim 8, wherein the state-display section displays various operating states of the apparatus.

14. The apparatus of claim 8, wherein:

the state-display section has a first dimension in the direction of the coupling connection; and the second housing further comprises a second display having a second dimension in the direction of the coupling connection which is greater than the first dimension of the state-display section.

15. The apparatus of claim 8, wherein the first housing further comprises a keyboard disposed therein and mounted on the main surface thereof.

16. The apparatus of claim 8, wherein, in the closed position of the first and second housings, a part of the mode switching key projects into the recess in the main surface of the associated housing in which the state-display section is disposed, in confronting, but non-contacting, relationship to the state-display section.

\* \* \* \* \*